(12) United States Patent
Hergenrother et al.

(10) Patent No.: US 8,097,674 B2
(45) Date of Patent: Jan. 17, 2012

(54) AMINO ALKOXY-MODIFIED SILSESQUIOXANES IN SILICA-FILLED RUBBER WITH LOW VOLATILE ORGANIC CHEMICAL EVOLUTION

(75) Inventors: William L. Hergenrother, Akron, OH (US); Chenchy Jeffrey Lin, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 136 days.

(21) Appl. No.: 12/347,017

(22) Filed: Dec. 31, 2008

(65) Prior Publication Data

US 2010/0071818 A1 Mar. 25, 2010

Related U.S. Application Data

(60) Provisional application No. 61/018,213, filed on Dec. 31, 2007, provisional application No. 61/017,932, filed on Dec. 31, 2007, provisional application No. 61/086,236, filed on Aug. 5, 2008.

(51) Int. Cl.
*B60C 1/00* (2006.01)
(52) U.S. Cl. ........ 524/552; 152/151; 428/403; 428/405; 423/449.7; 524/424; 525/100; 525/105; 528/38
(58) Field of Classification Search .................. None
See application file for complete search history.

(56) References Cited

U.S. PATENT DOCUMENTS

| | | | |
|---|---|---|---|
| 2,462,640 A | 2/1949 | Hyde | |
| 3,186,965 A | 6/1965 | Plueddemanu | |
| 3,304,318 A | 2/1967 | Brady | |
| 3,428,706 A | 2/1969 | Walmsley et al. | |
| 3,647,740 A | 3/1972 | Loree et al. | |
| 3,816,493 A | 6/1974 | Nitzsche et al. | |
| 4,101,460 A | 7/1978 | Small et al. | |
| 4,258,770 A | 3/1981 | Davis et al. | |
| 4,269,741 A | 5/1981 | Homan | |
| 4,340,515 A | 7/1982 | Frassek et al. | |
| 4,424,297 A | 1/1984 | Bey | |
| 4,512,897 A | 4/1985 | Crowder, III et al. | |
| 4,745,145 A | 5/1988 | Schonfeld et al. | |
| 4,822,681 A | 4/1989 | Schossler et al. | |
| 4,847,162 A | 7/1989 | Haluska et al. | |
| 5,015,717 A | 5/1991 | Martin et al. | |
| 5,162,409 A | 11/1992 | Mroczkowski | |
| 5,359,022 A | 10/1994 | Mautner et al. | |
| 5,363,994 A | 11/1994 | Angeline | |
| 5,447,971 A | 9/1995 | Bergh et al. | |
| 5,484,867 A | 1/1996 | Lichtenhan et al. | |
| 5,534,592 A | 7/1996 | Halasa et al. | |
| 5,650,474 A | 7/1997 | Yamaya et al. | |
| 5,684,113 A | 11/1997 | Nakanishi et al. | |
| 5,750,610 A | 5/1998 | Burns et al. | |
| 5,763,388 A | 6/1998 | Lightsey et al. | |
| 5,830,934 A | 11/1998 | Krishnan | |
| 5,844,060 A | 12/1998 | Furuya et al. | |
| 5,854,369 A | 12/1998 | Geck et al. | |
| 5,914,364 A | 6/1999 | Cohen et al. | |
| 5,916,973 A | 6/1999 | Zimmer et al. | |
| 5,929,149 A | 7/1999 | Matsuo et al. | |
| 5,932,757 A | 8/1999 | Standke et al. | |
| 5,958,161 A | 9/1999 | Grimberg et al. | |
| 5,969,057 A | 10/1999 | Schoeley et al. | |
| 5,985,371 A | 11/1999 | Fujioka et al. | |
| 5,985,953 A | 11/1999 | Lightsey et al. | |
| 6,015,850 A | 1/2000 | Nakamura et al. | |
| 6,033,597 A | 3/2000 | Yatsuyanagi et al. | |
| 6,124,491 A | 9/2000 | Wolter et al. | |
| 6,127,468 A | 10/2000 | Cruse et al. | |
| 6,140,447 A | 10/2000 | Gay et al. | |
| 6,191,247 B1 | 2/2001 | Ishikawa et al. | |
| 6,204,339 B1 | 3/2001 | Waldman et al. | |
| 6,232,424 B1 | 5/2001 | Zhong et al. | |
| 6,239,243 B1 | 5/2001 | Deng et al. | |
| 6,271,331 B1 | 8/2001 | Gay et al. | |
| 6,294,007 B1 | 9/2001 | Martin | |
| 6,313,205 B1 | 11/2001 | Chiron et al. | |
| 6,326,424 B1 | 12/2001 | Louis et al. | |
| 6,331,605 B1 | 12/2001 | Lunginsland et al. | |
| 6,372,843 B1 | 4/2002 | Barruel et al. | |
| 6,399,210 B1 | 6/2002 | Zhong | |
| 6,414,061 B1 | 7/2002 | Cruse et al. | |
| 6,426,378 B1 | 7/2002 | Lickes et al. | |

(Continued)

FOREIGN PATENT DOCUMENTS

| | | |
|---|---|---|
| JP | 11343366 | 12/1999 |
| JP | 2001-138164 | * 5/2002 |
| WO | 2005-093002 | 10/2005 |
| WO | 2006-031434 | 3/2006 |
| WO | 2008-025846 | 3/2008 |
| WO | 2009-085181 | 7/2009 |

OTHER PUBLICATIONS

Machine translation of JP 2001-138164.* Zimmer, Marc S., Jun. 26, 2009 Office Action from U.S. Appl. No. 11/387,569 (6 pp.).
Brown, Jr., John F. et al., "The Polycondensation of Phyenlsilanetriol", Journal of the American Chemical Society, vol. 87, No. 19, pp. 4317-4324 (Oct. 5, 1965).
Dittmar, Uwe et al., "Funktionalisierte Octa-(propylsilsesquioxane)(3-$XC_3H_6$)$_8$($Si_8O_{12}$) Modellverbindungen fur oberflachenmodifizierte Kieselgele", Journal of Organometallic Chemistry, 489 pp. 185-194, (1995) [with English translation].

(Continued)

*Primary Examiner* — Marc Zimmer
(74) *Attorney, Agent, or Firm* — Meredith E. Hooker; Nathan T. Lewis

(57) ABSTRACT

A vulcanizable rubber composition is presented that comprises an elastomer; a reinforcing filler selected from silica, carbon black, and mixtures thereof, a cure agent; and an amino alkoxy-modified silsesquioxane (AMS) comprising one or more compounds selected from the group consisting of an amino AMS, an amino/mercaptan co-AMS, an amino/blocked mercaptan co-AMS, mixtures thereof, and weak acid-neutralized solid and aqueous solutions thereof. Addition of such compounds to the rubber composition provides improved dynamic viscoelastic and mechanical properties of the vulcanized rubber compound and predict that tire components, especially tread stocks, will provide tires having improved snow traction, lower rolling resistance but equal wet traction, increased rebound, decreased hysteresis, and a general improvement in tire performance.

46 Claims, No Drawings

U.S. PATENT DOCUMENTS

| | | | |
|---|---|---|---|
| 6,429,245 | B1 | 8/2002 | Francik et al. |
| 6,433,065 | B1 | 8/2002 | Lin et al. |
| 6,433,077 | B1 | 8/2002 | Craig et al. |
| 6,455,158 | B1 | 9/2002 | Mei et al. |
| 6,465,670 | B2 | 10/2002 | Thise et al. |
| 6,465,671 | B1 | 10/2002 | Bae et al. |
| 6,528,673 | B2 | 3/2003 | Cruse et al. |
| 6,548,573 | B1 | 4/2003 | Rempert |
| 6,548,594 | B2 | 4/2003 | Luginsland et al. |
| 6,573,356 | B2 | 6/2003 | Araki et al. |
| 6,608,125 | B2 | 8/2003 | Cruse et al. |
| 6,611,518 | B1 | 8/2003 | Ngo et al. |
| 6,624,214 | B2 | 9/2003 | Zimmer et al. |
| 6,624,237 | B2 | 9/2003 | Biteau et al. |
| 6,635,700 | B2 | 10/2003 | Cruse et al. |
| 6,649,684 | B1 | 11/2003 | Okel |
| 6,653,365 | B2 | 11/2003 | Jia |
| 6,660,823 | B1 | 12/2003 | Lichtenhan et al. |
| 6,683,135 | B2 | 1/2004 | Cruse et al. |
| 6,689,834 | B2 | 2/2004 | Ackermann et al. |
| 6,696,155 | B1 | 2/2004 | Takano et al. |
| 6,727,339 | B2 | 4/2004 | Luginsland et al. |
| 6,767,930 | B1 | 7/2004 | Svejda et al. |
| 6,770,724 | B1 | 8/2004 | Lichtenhan et al. |
| 6,774,202 | B2 | 8/2004 | Lee |
| 6,774,569 | B2 | 8/2004 | de Vries et al. |
| 6,811,684 | B2 | 11/2004 | Mohr et al. |
| 6,841,197 | B2 | 1/2005 | Standke et al. |
| 6,852,794 | B2 | 2/2005 | Puhala et al. |
| 6,878,768 | B2 | 4/2005 | Tardivat et al. |
| 6,890,981 | B1 | 5/2005 | Luginsland |
| 6,903,150 | B2 | 6/2005 | Zimmer et al. |
| 6,911,518 | B2 | 6/2005 | Lichtenhan et al. |
| 6,919,469 | B2 | 7/2005 | Van Ooij et al. |
| 6,927,270 | B2 | 8/2005 | Lichtenhan et al. |
| 6,972,312 | B1 | 12/2005 | Lichtenhan et al. |
| 7,119,150 | B2 | 10/2006 | Lin et al. |
| 7,201,944 | B2 | 4/2007 | Hergenrother et al. |
| 7,393,564 | B2 | 7/2008 | Hergenrother et al. |
| 7,432,321 | B2 | 10/2008 | Joshi et al. |
| 7,799,870 | B2 | 9/2010 | Hergenrother et al. |
| 2001/0011046 | A1* | 8/2001 | Ichikawa et al. ............. 473/371 |
| 2002/0055564 | A1 | 5/2002 | Cruse et al. |
| 2002/0061409 | A1 | 5/2002 | Topp et al. |
| 2003/0055193 | A1 | 3/2003 | Lichtenhan et al. |
| 2003/0059393 | A1 | 3/2003 | Wrolson et al. |
| 2003/0088034 | A1 | 5/2003 | Luginsland et al. |
| 2003/0130388 | A1 | 7/2003 | Luginsland et al. |
| 2003/0199619 | A1 | 10/2003 | Cruse |
| 2004/0042980 | A1 | 3/2004 | Kanji et al. |
| 2004/0122180 | A1* | 6/2004 | Hergenrother et al. .... 525/326.1 |
| 2004/0210001 | A1 | 10/2004 | Cruse et al. |
| 2004/0266968 | A1 | 12/2004 | Korth et al. |
| 2005/0009982 | A1 | 1/2005 | Inagaki et al. |
| 2005/0010012 | A1 | 1/2005 | Jost et al. |
| 2005/0244659 | A1 | 11/2005 | Higuchi et al. |
| 2005/0277717 | A1 | 12/2005 | Joshi et al. |
| 2006/0083925 | A1 | 4/2006 | Laine et al. |
| 2006/0086450 | A1 | 4/2006 | Hogan et al. |
| 2006/0089446 | A1 | 4/2006 | Lin et al. |
| 2006/0217473 | A1* | 9/2006 | Hergenrother et al. ....... 524/261 |
| 2007/0275255 | A1 | 11/2007 | Ooms et al. |
| 2008/0293858 | A1 | 11/2008 | Hergenrother et al. |
| 2009/0165913 | A1 | 7/2009 | Hergenrother et al. |
| 2009/0171014 | A1 | 7/2009 | Hergenrother et al. |
| 2009/0181248 | A1* | 7/2009 | van Ooij et al. ............. 428/339 |
| 2009/0203929 | A1 | 8/2009 | Hergenrother et al. |
| 2009/0326255 | A1 | 12/2009 | Hergenrother et al. |

OTHER PUBLICATIONS

Dzhafarov, A.A. et al., "Synthesis and Properties of Organosilicon, Organogermanium, and Organotin Compounds [2-(Arylthio)Ethyl]-Silanes,—Germanes, and—Stannanes", Kalinin State University, Institute of Oil-Additive Chemistry, Academy of Sciences of the Azerbaidzhan SSR. Translated from Zhurnal Obshchei Khimii, vol. 45, No. 9, pp. 2023-2025, Sep. 1975.

Joshi, Mangala et al., "Polymeric Nanocomposites—Polyhedral Oligomeric Silsesquioxanes (POSS) as Hybrid Nanofiller", Journal of Macromolecular Science, Part C—Polymer Reviews, vol. 44, No. 4, pp. 389-410 (2004).
Rikowski, Eckhard et al., "Cage-rearrangement of silsesquioxanes", Polyhedron, vol. 16, No. 19, pp. 3357-3361 (1997).
van Ooij, W.J., "Mechanism and Theories of Rubber Adhesion to Steel Tire Cords", Rubber Chemistry and Technology, vol. 57, No. 3, pp. 421-456 (1984).
Product brochure, Gelest, Inc., "PolySilsesquioxanes and T-Resins $RSiO_{1.5}$", pp. 39-42, (2004).
Buestrich, R., Jul. 24, 2006 International Search Report from PCT Patent Application No. PCT/US2006/010610 (2 pp.).
Hergenrother, William L. et al., U.S. Appl. No. 12/344,804, filed Dec. 29, 2008 entitled "Methods of Making Blocked-Mercapto Alkoxy-Modified Silsesquioxane Compounds".
Hergenrother, William L. et al., U.S. Appl. No. 12/346,994, filed Dec. 31, 2008 entitled "Amino Alkoxy-Modified Silsesquioxanes And Method Of Preparation".
Hergenrother, William L. et al., U.S. Appl. No. 12/347,047, filed Dec. 31, 2008 entitled "Method For Making Alkoxy-Modified Silsesquioxanes And Amino Alkoxy-Modified Silsesquioxanes".
Hergenrother, William L. et al., U.S. Appl. No. 12/347,086, filed Dec. 31, 2008 entitled "Amino Alkoxy-Modified Silsesquioxane Adhesives for Improved Metal Adhesion And Metal Adhesion Retention To Cured Rubber".
Zimmer, Marc S., Nov. 20, 2009 Final Office Action from U.S. Appl. No. 11/387,569 (6 pp.).
Boiling Point Calculator from the web site http://www.partyman.se/boiling-point-calculator, downloaded Nov. 10, 2009 (2pp.).
Boiling Point Calculator from the web site http://www.trimen.pl/witek/calculators/wrzenie.html, downloaded Nov. 10, 2009 (2 pp.).
Nuss, A.J. et al., Decision of Technical Board of Appeal 3.3.1 dated Feb. 12, 1998, T990/96-3.3.1 (pp. 1-12).
Yu, Libing et al., "Preparation, Characterization, and Synthetic Uses of Lanthanide (III) Catalysts Supported on Ion Exchange Resins", J. Org. Chem., vol. 62, No. 11, pp. 3575-3581 (1997).
Database WPI Week 200026, Thomson Scientific, London, GB; AN 2000-298587, XP-002573380, & JP2000-086766, Mar. 28, 2000 (2 pp.).
Buestrich, Ralf, Apr. 15, 2008 Office Action from corresponding European Patent Application No. 06739416.3 (3 pp.).
Buestrich, Ralf, Aug. 17, 2009 Office Action from corresponding European Patent Application No. 06739416.3 (4 pp.).
Salvitti, Michael A., Apr. 29, 2010 Office Action from corresponding U.S. Appl. No. 12/344,804 (11 pp.).
Peng, Kuo Liang, May 18, 2010 Office Action from corresponding U.S. Appl. No. 11/752,715 (7 pp.).
Peng, Kuo Liang, Nov. 18, 2010 Notice of Allowance from corresponding U.S. Appl. No. 11/752,715 (5 pp.).
Salvitti, Michael A., Dec. 27, 2010 Advisory Action from corresponding U.S. Appl. No. 12/344,804 (7 pp.).
Hergenrother, William L. et al., "Reduction of Volatile Organic Compound Emission. I. Synthesis and Characterization of Alkoxy-Modified Silsesquioxane", Journal of Applied Polymer Science, vol. 115, pp. 79-90 (2010).
Nazina, Elena E., Mar. 22, 2010 Office Action from corresponding Russian Patent Application No. 2007139319 (6 pp.).
Cho, Han Sol, Apr. 20, 2010 International Search Report from PCT/US2009/069587 (4 pp.).
Xue, Haijiao, English translation of Apr. 27, 2010 First Office Action from corresponding Chinese Patent Application No. 200680018058.2 (11 pp.).
Salvitti, Michael A., Sep. 2, 2010 Final Office Action from corresponding U.S. Appl. No. 12/344,804 (14 pp.).
Peng, KuoLiang, May 11, 2011 Office Action from U.S. Appl. No. 12/347,047 (8 pp.).
Xue, Haijiao, May 19, 2011 Office Action with English translation from Chinese Patent Application No. 200680018058.2 (9 pp.).
Salvitti, Michael A., May 26, 2011 Office Action from U.S. Appl. No. 12/344,804 (11 pp.).
Peng, KuoLiang, Jun. 16, 2011 Office Action from U.S. Appl. No. 12/346,994 (10 pp.).

* cited by examiner

AMINO ALKOXY-MODIFIED SILSESQUIOXANES IN SILICA-FILLED RUBBER WITH LOW VOLATILE ORGANIC CHEMICAL EVOLUTION

RELATED APPLICATIONS

This application claims priority from U.S. Provisional Applications Ser. Nos. 61/018,213 and 61/017,932 filed Dec. 31, 2007, and U.S. Provisional Application Ser. No. 61/086,236 filed Aug. 5, 2008, the entire disclosures of which are incorporated herein by reference. This application is also related to U.S. patent application Ser. No. 12/347,086, filed Dec. 31, 2008, that also claims priority from the three above-referenced U.S. Provisional Applications.

BACKGROUND OF THE INVENTION

As the present trend in tire-making technology continues toward the use of higher silica loadings in rubber compounds, there is a challenge to contain levels of environmentally released volatile organic compounds (VOC), especially alcohol, during compounding, processing, cure and storage of silica-reinforced rubbers.

In our U.S. patent application Ser. No. 11/387,569, filed Mar. 23, 2006, entitled "Compounding Silica-Reinforced Rubber With Low Volatile Organic Compound (VOC) Emission," the entire disclosure of which is hereby incorporated by reference, we described the preparation of alkyl alkoxy-modified silsesquioxane (alkyl AMS) compounds and alkyl/mercaptan co-alkoxy-modified silsesquioxane (alkyl/mercaptan co-AMS) compounds that generate less alcohol than conventional alkoxysilane-containing silica-coupling and/or silica dispersing agents used in rubber compounding. It was found that the decreased amount of alcohol produced when using the alkyl AMS and alkyl/mercaptan co-AMS compounds in rubber compositions resulted in vulcanized rubber compounds having one or more improved properties such as, but not limited to, enhanced rubber reinforcement, increased polymer-filler interaction and lower compound viscosity, providing for tires having improved wet and snow traction, lower rolling resistance, increased rebound and decreased hysteresis.

However, at the time of filing the above-referenced patent application, it was unknown how to produce similar AMS compounds that also contained amino groups, i.e., an amino AMS, an amino/mercaptan co-AMS, and an amino/blocked mercaptan co-AMS. It was also unknown what effects the addition of such amino AMS and/or amino co-AMS compounds to rubber compounds would have on the properties of such rubber compounds and components of tires containing the rubber compounds.

U.S. Provisional Patent Application Ser. Nos. 61/017,932 and 61/018,213, filed Dec. 31, 2007, describe methods for making amino AMS and amino/mercaptan co-AMS compounds, and the entire disclosures of both applications are hereby incorporated by reference.

SUMMARY OF THE INVENTION

It has been discovered very unexpectedly that the addition of amino AMS and/or amino/mercaptan AMS compounds to vulcanizable rubber compositions results in improvements to the properties of the vulcanized rubber compounds that are enhanced in comparison to vulcanized rubber compounds comprising the alkyl AMS and/or alkyl/mercaptan co-AMS compounds described in our U.S. patent application Ser. No. 11/387,569 above. Without being bound by theory, it is believed that the presence of the amino groups on the AMS and/or amino/mercaptan co-AMS compounds may be responsible for an observed increase in the polymer-filler interaction and, if present, the mercapto content is responsible for bonding to the rubber, resulting in the enhanced modulus, toughness, reduced hysteresis, lower compound viscosity and increased rubber reinforcement observed in the invention rubber compounds. Such improved dynamic viscoelastic and mechanical properties of the invention rubber compounds predict that tire components, especially tread stocks, will provide for tires having improved snow traction, lower rolling resistance but equal wet traction, increased rebound, decreased hysteresis, and a general improvement in tire performance.

In particular, a vulcanizable rubber composition is presented that comprises an elastomer; a reinforcing filler selected from silica, carbon black, and mixtures thereof, a cure agent; and an amino alkoxy-modified silsesquioxane (AMS) comprising one or more compounds selected from the group consisting of an amino AMS, an amino/mercaptan co-AMS, an amino/blocked mercaptan co-AMS, mixtures thereof, and weak acid-neutralized solid and aqueous solutions thereof. As employed in this description, the term "amino/mercaptan co-AMS" is meant to include the amino/blocked mercaptan co-AMS, unless otherwise designated. The term "amino AMS" is also meant to encompass an amino co-AMS that can comprise other molecules, especially, but not limited to, those having groups that can react with rubber such as, but not limited to, acrylates, methacrylates, amino, vinyl, mercapto, sulfur and sulfide groups, and the like.

In a very suitable arrangement, the amino AMS comprises an amino/mercaptan co-AMS. In another arrangement, the amino alkoxy-modified silsesquioxane is in an aqueous solution that has been neutralized by a weak acid, and has a pH of about 6.5 to about 4.0. The liquid amino AMS can be at least partially supported on the reinforcing filler. The rubber composition can further comprise a catalyst for an alkoxysilane-silica reaction.

The invention further includes a pneumatic tire including at least one component comprising a vulcanized rubber compound made from the vulcanizable rubber composition, and a pneumatic tire wherein the at least one component comprises a tire tread.

DETAILED DESCRIPTION OF THE INVENTION

In one arrangement, a vulcanizable rubber composition according to the invention comprises an elastomer; a reinforcing filler selected from silica, carbon black, and mixtures thereof, a cure agent; and an amino alkoxy-modified silsesquioxane (AMS) comprising one or more compounds selected from the group consisting of an amino AMS, an amino/mercaptan co-AMS, an amino/blocked mercaptan co-AMS, mixtures thereof, and weak acid-neutralized solid and aqueous solutions thereof, and having the formula

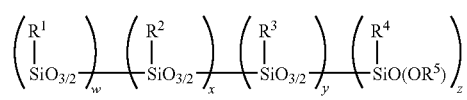

wherein w, x, y and z represent mole fractions, z does not equal zero, at least one of w, x or y must also be present, and w+x+y+z=1.00;

wherein at least one of $R^1$, $R^2$, $R^3$ and $R^4$ must be present and selected from the group consisting of $R^6Z$, wherein Z is selected from the group consisting of $NH_2$, $HNR^7$ and $NR^7_2$; and the remaining $R^1$, $R^2$, $R^3$ or $R^4$ are the same or different and selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, (iv) $R^6X$, wherein X is selected from the group consisting of Cl, Br, SH, $S_aR^7$, $NR^7_2$, $OR^7$, $CO_2H$, $SCOR^7$, $CO_2R^7$, OH, olefins, epoxides, amino groups, vinyl groups, acrylates and methacrylates, wherein a=1 to about 8, and (v) $R^6YR^8X$, wherein Y is selected from the group consisting of O, S, NH and $NR^7$; wherein $R^6$ and $R^8$ are selected from the group consisting of alkylene groups having one to about 20 carbon atoms, cycloalkylene groups having 3 to about 20 carbon atoms, and a single bond; and $R^5$ and $R^7$ are selected from the group consisting of alkyl groups having one to about 20 carbon atoms, cycloalkyl groups having 3 to about 20 carbon atoms, and alkylaryl groups having 7 to about 20 carbon atoms.

As described in our copending U.S. Patent Application, filed at the same time as this application, entitled "Amino Alkoxy-Modified Silsesquioxanes and Method of Preparation," the mixture of amino alkoxy-modified silsesquioxanes consists essentially of amino alkoxy-modified silsesquioxanes having an open cage structure or ladder-like structure with a reactive alkoxysilyl group and being essentially free of closed caged polyhedral organosilsesquioxanes. That is, at least one of the $R^1$, $R^2$, $R^3$ and $R^4$ groups in every amino AMS molecule is attached to a silane that has an alkoxy (OR) group. In contrast to the amino AMS structures according to the invention, a closed caged structure such as a polyhedral oligomeric silsesquioxane (POSS) or the like, contains substantially no Si—OR (alkoxysilane) bonds, but only Si—O—Si bonds. Further, the amino AMS mixture has a multitude of structures that, as such, cannot be identified by a spectrum of one pure component. The mixture of amino alkoxy-modified silsesquioxanes liberates about 0.05% to about 10% by weight alcohol when treated by substantially total acid hydrolysis.

At least one of the $R^1$, $R^2$, $R^3$ and $R^4$ groups of the amino alkoxy-modified silsesquioxane comprises a group that can bind to an elastomer. Such groups include, but are not limited to, acrylates, methacrylates, amino, vinyl, mercapto, sulfur and sulfide groups, and the like. In one arrangement, the at least one of the $R^1$, $R^2$, $R^3$ and $R^4$ groups of the amino alkoxy-modified silsesquioxane can be, but is not limited to, a mercaptoalkyl group, a blocked mercaptoalkyl group, and an organo group containing a chain of about 2 to about 8 sulfur atoms, and the like. In a particularly suitable arrangement for use in rubber compounding, the amino AMS comprises an amino/mercaptan co-AMS.

In another suitable arrangement, the amino alkoxy-modified silsesquioxane is in an aqueous solution that has been neutralized by a weak acid, and has a pH of about 6.5 to about 4.0, suitably about 6.0 to about 5.0. Suitable weak acids can have a $pK_a$ of about 3.5 to about 6.5. For example, the weak acid can comprise, but is not limited to, a weak carboxylic acid such as, but not limited to, acetic acid, ascorbic acid, itaconic acid, lactic acid, malic acid, naphthilic acid, benzoic acid, o-toluic acid, m-toluic acid, p-toluic acid, and the like, and mixtures thereof.

Briefly, in a general but non-limiting example, the amino AMS compound(s) can be made by subjecting an aminotrialkoxysilane to hydrolysis and condensation in an aqueous alcohol solution in the presence of a hydrolysis and condensation catalyst. Suitable hydrolysis and condensation catalysts for use in making the amino AMS compounds are known and include, but are not limited to, strong acids such as hydrochloric acid, sulfuric acid, phosphoric acid, toluenesulfonic acid, and the like; strong bases such as sodium hydroxide, potassium hydroxide, lithium hydroxide and the like; and strong organic acids and bases, such as DBU (1,8-diazabicyclo[5.4.0] undec-7-ene), DBN (1,5-diazabicylo-[4.3.0] non-5-ene), imidazoles, guanidines and the like; and mixtures of these. The hydrolysis and condensation catalyst is also suitably a solid strong cationic resin such as, but not limited to, those described in methods for making amino AMS compounds using such resins as disclosed in our U.S. Provisional Patent Application Ser. No. 61/017,932 filed Dec. 31, 2007, the entire disclosure of which is hereby incorporated by reference.

The reaction is continued for a period of time sufficient for substantially total conversion of the aminotrialkoxysilane to the amino AMS compound(s). The amino AMS product is then removed from the reaction mixture by distillation of solvent after first neutralizing the amine and the catalyst. Solvent replacement with water will give a stable aqueous concentrated solution. Examples of methods for making suitable amino AMS and amino/mercaptan co-AMS compounds are described in our U.S. Provisional Patent Application Ser. Nos. 61/017,932 and 61/018,213, filed Dec. 31, 2007, and in the examples below. However, these examples are not intended to be limiting. From the teachings of this disclosure, other methods for making the compound(s) will become apparent to those skilled in the art.

In particular, in the example illustrated below, the hydrolysis and condensation catalyst comprises a solid strong cationic hydrolysis and condensation catalyst. In this method of making the amino AMS compound, the weak acid buffer is used in the reaction mixture to neutralize the amine functionality during the preparation of the amino AMS so that the solid strong cationic resin can function as the hydrolysis and condensation catalyst. The weak acid buffer (which is not an AMS catalyst) can also act as a stabilizer so that the amine salt in water will not further condense to give an insoluble gelled structure. In this method, the solid strong cationic catalyst can easily be recovered from the reaction mixture as a precipitate, such as by filtration and the like, providing for its reuse in subsequent reactions. An advantage to the use of this method is that the recovered amino AMS products are free of, or substantially free of, residual strong acid catalyst. The method can further comprise the step of recovering the solid strong cationic catalyst from the reaction mixture for recycling the catalyst.

Suitable solid strong cationic hydrolysis and condensation catalysts for use in making the amino AMS are commercially available and include, but are not limited to, cationic ion exchange resins that have sulfonic acid groups attached to an insoluble polymeric matrix. For example, these solid resins contain a $H^+$ counter ion that is a strong cation exchanger due to its very low pKa (<1.0). As a non-limiting example, such cationic ion exchange resins can be prepared by sulfonating (by treating with sulfuric acid) a polystyrene that has been crosslinked with about 1 percent to about 8 percent divinylbenzene. Examples of suitable commercially available strong cationic exchange resins include, but are not limited to, the $H^+$ ionic form of Amberlite IR-120, Amberlyst A-15, Purolite C-100, and any of the Dowex® 50WX series resins. Such resins are typically gel beads having particle sizes of about 400 mesh to about 50 mesh. The particle size is not crucial in the methods of the invention. Other types of solid supports for the strong cationic ions have been described, such as, but not limited to, polymer strips, polymer membranes, and the like, and are within the scope of the invention. Suitably, the solid strong cationic catalysts are in a physical form that, after the amino AMS or amino co-AMS products are extracted, will precipitate (or sink) to the bottom of the reaction chamber for simple separation from the reaction mixture, such as by filtration or the like.

In general, for use in rubber compounds, a suitable amino AMS can be prepared by the hydrolysis and condensation of an aminotrialkoxysilane. A suitable amino co-AMS compound can be manufactured by the co-hydrolysis and co-condensation of an aminotrialkoxysilane with, for example, a mercaptoalkyltrialkoxysilane to introduce a mercaptoalkyl functionality, or with a blocked mercaptoalkyltrialkoxysilane to introduce a blocked mercaptoalkyl functionality. In another arrangement, a blocking agent can be bonded to an amino AMS product containing an SH group subsequent to the condensation reaction, as described in the above-referenced U.S. patent application Ser. No. 11/387,569.

Examples of suitable aminotrialkoxysilane reactants include, but are not limited to, 3-[N-(trimethoxysilyl)-propyl]-ethylenediamine, 3-[N-(triethoxysilyl)-propyl ]-ethylene-diamine, 3-aminopropyltriethoxysilane, and the like. Examples of suitable sulfur-containing trialkoxysilanes include, but are not limited to mercaptoalkyltrialkoxysilanes, blocked mercaptoalkyltrialkoxysilanes, 3-mercaptopropyl-trialkoxysilane, 3-thioacylpropyltrialkoxy-silane, 3-thiooctanoyl-propyltrialkoxysilane, and the like.

In this description the use of the term "blocked mercaptoalkyltrialkoxysilane" is defined as a mercaptosilane silica coupling agent that comprises a blocking moiety that blocks the mercapto part of the molecule (i.e. the mercapto hydrogen atom is replaced by another group, hereafter referred to as "blocking group") while not affecting the silica-reactive mercaptosilane moiety. Suitable blocked mercaptosilanes can include, but are not limited to, those described in U.S. Pat. Nos. 6,127,468; 6,204,339; 6,528,673; 6,635,700; 6,649,684; 6,683,135; the disclosures of which are hereby incorporated by reference with respect to the examples described. For purposes of this disclosure, the silica-reactive "mercaptosilane moiety" is defined as the molecular weight equivalent to the molecular weight of 3-mercaptopropyltriethoxysilane. A deblocking agent can be added during or after rubber compounding (e.g., later in the manufacturing process, such as during cure), after the silica-silane reaction has occurred, to allow the sulfur atom of the mercaptosilane to bond rapidly with the rubber. The deblocking agent can be added at any time during the compounding process as a single component during any mixing stage in which deblocking is desired. Examples of deblocking agents are well known to those skilled in the art.

The amino AMS and/or the amino/mercaptan co-AMS may be present in the vulcanizable rubber compositions according to the invention in an amount of about 0.01 to about 20 phr, suitably about 0.1 to about 15 phr or, in some cases, about 1 to about 10 phr, or about one to about 5 phr, or 0.1% to about 25% by weight, especially about 0.1% to about 15% by weight, based on the weight of the silica.

The amino AMS and/or the amino/mercaptan co-AMS may also be used in conjunction with any AMS and/or co-AMS such as those described in our U.S. patent application Ser. No. 11/387,569, filed Mar. 23, 2006, and those described in our U.S. Provisional Patent Application Ser. Nos. 61/017,932 and 61/018,213. The additional AMS and/or co-AMS may be present in an amount of about 0.1 to about 20 phr, suitably about one to about 15 phr or, in some cases, about 5 to about 10 phr, or about one to about 5 phr or 0.1% to about 25% by weight, especially about 0.1% to about 15% by weight, based on the weight of the silica.

The vulcanizable rubber compositions according to the invention can comprise any solution polymerizable or emulsion polymerizable elastomer. Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. The elastomers that are typically employed within vulcanizable compositions that are useful for making tires and tire components include both natural and synthetic elastomers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene diene rubber (EPDM), acrylonitrile/butadiene rubber (NBR), silicone rubber, fluoroelastomers, ethylene acrylic rubber, ethylene vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber and the like. Preferred polymers for use in a vulcanizable rubber compositions of the invention include polyisoprene, polybutadiene, butadiene/isoprene copolymer, butadiene/isoprene/styrene terpolymer, isoprene/styrene copolymer, and styrene/butadiene copolymer. As used herein, the term elastomer or rubber will refer to a blend of synthetic and natural rubber, a blend of various synthetic rubbers, or simply one type of elastomer or rubber. When the preferred polymers are blended with conventional rubbers, the amounts can vary widely within a range comprising from about one to about 100 percent by weight of the total rubber, with the conventional rubber or rubbers making up the balance of the total rubber (100 parts).

The elastomers that are useful in practicing this invention include any of the various functionalized polymers that are conventionally employed in the art of making tires. For example, polymers can be terminally functionalized, or functionalized throughout the polymer backbone, such as with functional groups derived from an anionic polymerization initiator or a terminating or coupling agent. Preparation of functionalized polymers is well known to those skilled in the art. Exemplary methods and agents for functionalization of polymers are disclosed, for example, in U.S. Pat. Nos. 5,268,439, 5,496,940, 5,521,309 and 5,066,729, the disclosures of which are hereby incorporated by reference. For example, compounds that provide terminal functionality that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidonones, tin tetrachloride, tributyl tin chloride, carbon dioxide, and mixtures thereof. Other useful terminating agents can include those of the structural formula $(R)_a ZX_b$, where Z is tin or silicon, R is an alkyl having from about one to about 20 carbon atoms, a cycloalkyl having from about 3 to about 30 carbon atoms; and aryl having from about 6 to about 20 carbon atoms, or an aralkyl having from about 7 to about 20 carbon atoms. For example, R can include methyl, ethyl, n-butyl, neophyl, phenyl, cyclohexyl, or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride and butyl silicon trichloride, as well as tetraethoxysilane, $Si(OEt)_4$, and methyl triphenoxysilane, $MeSi(OPh)_3$. The practice of the present invention is not limited solely to polymers terminated with these agents, since other compounds that are reactive with the polymer bound carbon-lithium moiety can be selected to provide a desired functional group.

The vulcanizable rubber compositions of the invention are preferably compounded with reinforcing fillers, such as silica, carbon black or mixtures of these. Examples of suitable silica reinforcing filler include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about one to about 150 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J. M. Huber Corporation.

The elastomers can be compounded with all forms of carbon black in a mixture with the silica. The carbon black can be present in amounts ranging from about one to about 50 phr, with about five to about 35 phr being preferred. When both carbon black and silica are employed in combination as the reinforcing filler, they are often used in a carbon black-silica ratio of about 0:1 to about 1:10. The carbon blacks can include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

Alternatively, or in addition to one or more groups that bind to the elastomer, the rubber compound can optionally contain an added sulfur containing coupling agent, such as, but not limited to mercaptoalkyltrialkoxy silanes, blocked mercaptoalkyltrialkoxy silanes, mercaptoalkylsilanes bound to silica, blocked mercaptoalkylsilanes bound to silica, bis(trialkoxysilylorgano) tetrasulfides or disulfides, and the like, in an amount of about 0.05 to about 3% based on the silica. A particularly useful commercial product containing a mercaptosilane supported on silica is available from PPG Industries, as Ciptane® 255LD that is a mercaptosilane fixed to silica with substantially no trialkoxysilane present. When this product is used, the amount of silica in the rubber compound can be adjusted for the added silica from the Ciptane® to make the desired total amount of silica. Exemplary mercaptosilanes include, but are not limited to, 1-mercaptomethyltriethoxysilane, 2-mercaptoethyltriethoxysilane, 3-mercapto-propyltriethoxysilane, 3-mercaptopropylmethyl-diethoxysilane, 2-mercaptoethyl-triproxysilane, 18-mercaptooctadecyldiethoxychlorosilane, and the like. The mercaptosilane can be present in the compound in an amount of about 0.0001% to about 3% by weight, typically about 0.001% to about 1.5% by weight, and especially about 0.01% to about 1% by weight, based on the weight of the silica. Exemplary bis(trialkoxysilylorgano)polysulfide silica coupling agents include, but are not limited to, bis(3-triethoxysilyl-propyl)tetrasulfide (TESPT), which is sold commercially under the tradename Si69 by Degussa Inc., New York, N.Y., and bis(3-triethoxysilylpropyl) disulfide (TESPD) or Si75, available from Degussa, or Silquest® A1589, available from Crompton. The polysulfide organosilane silica coupling agent can be present in an amount of about 0.01% to about 20% by weight, based on the weight of the silica, preferably about 0.1% to about 15% by weight, and especially about 1% to about 10%.

In addition to the amino AMS, the amino/mercaptan co-AMS and/or the amino/blocked mercaptan co-AMS compounds according to the invention, exemplary silica dispersing aids suitable for use in the invention include, but are not limited to an alkyl alkoxysilane, an alkoxy-modified silsesquioxane (AMS and/or co-AMS), a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler, as described in greater detail below. Exemplary fatty acid esters of hydrogenated and non-hydrogenated $C_5$ and $C_6$ sugars (e.g., sorbose, mannose, and arabinose) that are useful as silica dispersing aids include, but are not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80. A useful amount of these additional silica dispersing aids when used with the bis(trialkoxysilylorgano) polysulfide silica coupling agents is about 0.1% to about 25% by weight based on the weight of the silica, with about 0.5% to about 20% by weight being preferred, and about 1% to about 15% by weight based on the weight of the silica being more preferred. In the alkyl alkoxysilane and mercaptosilane embodiment of the invention, it may be desirable to use about 0.1% to about 20% by weight of the fatty acid ester based on the weight of the silica. Esters of polyols, including glycols such as polyhydroxy compounds and the like, in the same quantities, are also useful in all invention embodiments.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, T-Maz® 80, and the like. The Tween® products are commercially available from ICI Specialty Chemicals. Generally, a useful amount of these optional silica dispersing aids is about 0.1% to about 25% by weight based on the weight of the silica, with about 0.5% to about 20% by weight being preferred, and about 1% to about 15% by weight based on the weight of the silica being more preferred.

The silica coupling agents, the alkyl alkoxysilanes, the AMS and/or the co-AMS compounds, the amino AMS and/or the amino/mercaptan co-AMS and/or the blocked amino/mercaptan co-AMS, the fatty acid esters and their polyoxyethylene derivatives, and the strong organic base catalysts, can be fully or partially supported by the reinforcing filler. The ratio of the dispersing aid or catalyst to the reinforcing filler is not critical. If the dispersing aid is a liquid, a suitable ratio of dispersing aid to filler is that which results in a suitably dry material for addition to the elastomer. For example, the ratio can be about 1/99 to about 70/30, about 20/80 about 60/40, about 50/50, and the like. The latent alcohol content of a 50/50 ratio of an amino AMS or an amino/mercaptan co-AMS supported on a reinforcing filler can be about 0.5% to about 3%.

Certain additional fillers can be utilized according to the present invention as processing aids, including mineral fillers, such as clay (hydrous aluminum silicate), talc (hydrous magnesium silicate), aluminum hydrate [Al(OH)$_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr. These additional fillers can also be used as non-reinforcing fillers to support the strong organic base catalysts, as well as any of the silica dispersing aids, and silica coupling agents described above. As with the support of the silica dispersing aid on the reinforcing filler, as described above, the ratio of dispersing aid to non-reinforcing filler is not critical. For example, the ratio can be about 1/99 to about 70/30, about 20/80 about 60/40, about 50/50, and the like, by weight. The latent alcohol content of a 50/50 ratio of an amino alkoxy-modified silsesquioxane supported on the non-reinforcing filler ca is about 0.5% to about 3%.

The vulcanizable rubber compositions can also include a catalyst for the alkoxysilane-silica reaction such as, but not limited to a strong organic base having a $pK_a$ in aqueous media of greater than about 10, a strong inorganic base, an alkyl tin catalyst, a zirconium catalyst, a titanium catalyst, and the like, and combinations thereof. For example, strong organic bases suitable for use as a catalyst in the invention preferably have a $pK_a$ in aqueous media of greater than about 10, more preferably greater than about 11 and, optimally, greater than about 12. The strong base can be present in the compound in an amount of about 0.01% to about 10%, typically about 0.1% to about 5%, based on the weight of the silica. A catalytic amount of the strong organic base is typically about 0.003 per hundred parts rubber (phr) to about 8 phr, typically about 0.03 phr to about 4 phr. Exemplary strong organic bases for use in the invention compounds include, but are not limited to, strong alkali metal alkoxides, such as sodium or potassium alkoxide; guanidines, such as triphenylguanidine (TPG), diphenylguanidine (DPG), di-o-tolylguanidine (DTG), N,N,N',N'-tetramethylguanidine (TMG), and the like; and hindered amine bases, such as 1,8-diazabicyclo[5.4.0]undec-7-ene (DBU), 1,5-diazabicyclo[4.3.0]non-5-ene (DBN), and the like, tertiary amine catalysts, such as N,N-dimethylcyclohexylamine, triethylenediamine, triethylamine, and the like, quaternary ammonium bases, such as tetrabutylammonium hydroxide, bis-aminoethers, such as bis(dimethylaminoethyl)ethers, and the like, nitrogen-containing heterocycles such as, but not limited to, such heterocycles having from 5 to 7 ring members. A non-limiting example of a nitrogen-containing heterocycle is a substituted or unsubstituted imidazole such as, but not limited to, imidazole, 4-ethylamino imidazole, 2-mercapto-1-methyl imidazole, 1-methyl imidazole, 2,4,5-triphenyl imidazole, 2-methyl imidazole, 2-ethyl-4-methyl imidazole, 2-heptadecyl imidazole, and the like.

Suitable catalysts for alkoxysilane-silica reaction can further include alkyl tin compounds such as, but not limited to, butyl tin tris(2-ethylhexanoate), bis(2-ethyl-hexanoate) tin, butyl tin chloride dihydroxide, butyl tin hydroxide oxide hydrate, dibutyl tin dilaurate, dibutyl tin dimaleate, dibutyl tin oxide, and the like. A catalytic amount of the alkyl tin compound can be about 0.01% to about 5% by weight, suitably about 0.05% to about 3% by weight, and about 0.1% to about 2% by weight, based on the weight of the silica.

Additional suitable catalysts for alkoxysilane-silica reaction can further include zirconium compounds. Examples of suitable zirconium catalysts include, but are not limited to, zirconium 2-ethylhexanoate, zirconium tetrakis-(2-ethylhexanoate), tetraoctyl zicronate, zirconium n-butoxide, zirconium t-butoxide, zirconium di-n-butoxide (bis-2,4-pentanedionate), zirconium diisopropoxide bis(2,2,6,6-tetramethyl-3,5-heptanedionate), zirconium ethoxide, zirconium 2-ethylhexoxide, zirconium 3,5-heptanedionate, zirconium isopropoxide, zirconium 2-methyl-2-butoxide, zirconium 2,4-pentanedionate, zirconium n-propoxide, and the like. A catalytic amount of the zirconium compound can be about 0.01% to about 5% by weight, suitably about 0.05% to about 3% by weight, and about 0.1% to about 2% by weight, based on the weight of the silica.

Additional suitable catalysts for alkoxysilane-silica reaction can further include titanium compounds. Examples of suitable titanium catalysts include, but are not limited to, titanium trimethylsiloxide, titanium (isopropoxide)$_2$(2,4-pentandionate)$_2$, titanium (butoxide)$_2$(2,4-pentandionate)$_2$, titanium (isopropoxide)$_2$(ethyl-acetoacetate)$_2$, and the like. A catalytic amount of the titanium compound can be about 0.01% to about 5% by weight, suitably about 0.05% to about 3% by weight, and about 0.1% to about 2% by weight, based on the weight of the silica.

It is recognized that suitable catalysts can be mixtures of any of the above categories and subcategories.

The vulcanizable rubber compositions are compounded or blended by using mixing equipment and procedures conventionally employed in the art, such as mixing the various vulcanizable polymer(s) with reinforcing fillers and commonly used additive materials such as, but not limited to, curing agents, activators, retarders and accelerators; processing additives, such as oils; resins, including tackifying resins; plasticizers; pigments; additional fillers; fatty acid; zinc oxide; waxes; antioxidants; antiozonants; peptizing agents; and the like. As known to those skilled in the art, the additives mentioned above are selected and commonly used in conventional amounts.

Preferably, an initial master batch is prepared that includes the rubber component and the reinforcing fillers, as well as other optional non-curative additives, such as processing oil, antioxidants, and the like. After the master batch is prepared, one or more optional remill stages can follow in which either no ingredients are added to the first mixture, or the remainder of the non-curing ingredients are added, in order to reduce the compound viscosity and improve the dispersion of the reinforcing filler. The final step of the mixing process is the addition of vulcanizing agents to the mixture.

According to the embodiments of this invention, it is preferred to add the amino AMS and/or the amino/mercaptan co-AMS compound during preparation of the master batch. However, the invention compound(s) alternatively can be added during subsequent stages, including the remill stage(s) and/or the final stage, and still provide the desired processability of the compound, as well as the favorable mechanical and viscoelastic properties, including improved modulus of the final rubber compound.

The vulcanizable composition can then be processed according to ordinary tire manufacturing techniques. Likewise, the tires are ultimately fabricated by using standard rubber curing techniques. For further explanation of rubber compounding and the additives conventionally employed, one can refer to The Compounding and Vulcanization of Rubber, by Stevens in Rubber Technology, Second Edition (1973 Van Nostrand Reibold Company), which is incorporated herein by reference. The reinforced rubber compounds can be cured in a conventional manner with known vulcanizing agents at about 0.1 to 10 phr. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Preferably, the rubber compounds are sulfur-vulcanized. Cured or crosslinked polymers will be referred to as vulcanizates for purposes of this disclosure.

When the amino AMS compounds are employed in the vulcanizable rubber composition and tire components, according to the invention, an amount of alcohol released as VOC during compounding and further processing is substantially zero to about 0.1% by weight of the rubber compound, more suitably is substantially zero to about 0.05% by weight of the rubber compound.

The vulcanizable rubber compositions of the present invention can be utilized to form treadstocks for tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, sidewalls, body ply skims, bead fillers, apex, chafer, sidewall insert, wirecoat, inner liner, and the like, and combinations of these.

Without being bound by theory, it is believed that the limited amount of alcohol that is available in the amino AMS or amino co-AMS product(s) make these compounds very useful in rubber compounds because they have the potential to reduce the level of potential VOCs emitted as alcohol during compounding and further processing. Moreover, it is believed that the limited amount of available unreacted alkoxysilane groups during and after mixing, could advantageously limit the degree of blistering in the vulcanized rubber compounds and tires made from them. Moreover, it is believed that the use of the products of the invention could allow a significant increase in the amount of silica used for reinforcement.

EXAMPLES

The following examples illustrate a method of preparation of a representative amino/mercaptan co-AMS compound and rubber compounds and tire components containing them. However, the examples are not intended to be limiting, as other similar amino/mercaptan co-AMS compounds can be prepared according to the described method. Furthermore, the described method is exemplary only and other suitable methods for preparing the amino/mercaptan co-AMS and other rubber compounds, including different compounding formulations, are described in our U.S. Provisional Patent Application Ser. Nos. 61/017,932 and 61/018,213, and others can be determined by those skilled in the art without departing from the scope of the invention herein disclosed and claimed.

Example 1

Preparation of an amino/mercaptan co-AMS with organic carboxylic acid neutralization and a strong cationic resin catalyst. In particular, preparation of a co-AMS with 30 mol % of a mercaptopropyl silane, and using a Dowex 50WX2-100E strong cationic resin catalyst.

A strong cationic resin catalyst was used to prepare a co-AMS containing an aminoalkylene silane, a mercaptopropyl silane and a weak carboxylic acid. The co-AMS product was readily obtained in an alcohol water solution by filtration from the insoluble cationic resin. Replacement of virtually all of the alcohol with water can readily be done by addition of water and distillation of the alcohol solvent to give a desired stable aqueous solution at a selected concentration. After the reaction, the recovered strong cationic resin catalyst was available for reuse for subsequent synthesis reactions.

To a 250 mL Erlenmeyer flask was added 15.76 g (71.0 mmol) of 3-[N-(trimethoxy-silyl)-propyl]-ethylenediamine, 5.97 g (30.4 mmol) of 3-mercaptopropyl trimethoxysilane, 77.95 g (101.9 mL) of absolute ethanol, 8.68 g. (65.1 mmol) of acetic acid (1.07 equivalents/amine) and 11.97 g (664 mmol) of distilled water. To this solution was added 1.75 g of water washed and dried Dowex 50WX2-100E (7.07 mmol of acid) strong cationic polystyrene resin (containing 15.9% water by TGA, crosslinked with 2% divinylbenzene, 100 mesh extracted particles).

After stirring for 24 hours, the solution was still clear and the Dowex resin was separated by filtration through a medium sintered glass filter. The product as the diacetate of the amino portion of the amino/mercapto co-AMS was recovered by evaporation of the solvent by heating and a nitrogen purge to give after drying 24.00 g (102% based on the salt) of a sticky viscous oil. The recovered Dowex resin weighed 1.89 g and contained 22.1% water, for total recovery of the resin. The latent alcohol concentration of the amino/mercapto co-AMS was determined to be 2.94%.

A solution of amino/mercaptan co-AMS comprising 34 wt % of water and 66 wt % of the diacetate salt of the amino silane was used in the rubber composition, either as a solution or supported on the reinforcing or non-reinforcing filler. The presence of 24.8 wt % of acetic acid controlled the pH of the aqueous product to 5.45. The solution also contained 41.1 wt % of co-AMS which was prepared by hydrolysis and condensation of 30.1 mol % of 3-mercaptopropyl trimethoxysilane and 69.9 mole % of N-[(3-trimethoxysilyl)-propyl] ethylene diamine, with Dowex 50X2-200E as the solid cationic exchange resin catalyst.

The sticky viscous oil also was found to disperse well into rubber stocks by standard mixing procedures. In some cases, however, to improve handling a 5.0 g portion was added to a suspension of 5.0 g of N339 carbon black in 21 g of ethanol. After dissolving, the carbon black-supported dry mixture was isolated by heat and nitrogen purging to give a tack free 50/50 mixture of the AMS on carbon black. This was effective as a compounding additive to introduce the AMS easily into rubber stock formulations. Latent alcohol was measured on the original AMS and the 1/1 carbon black-supported mixture and were 2.94% and 1.69% ethanol, respectively.

Example 2

Use of Amino/Mercaptan Co-AMS in a Silica-Filled Rubber

The solution of the amino/mercaptan co-AMS produced in Example 1 was evaluated in a carbon black and silica filled styrene-butadiene (SBR) tread formulation illustrated in Table 1. All of the ingredients are listed in parts per hundred rubber (phr). The masterbatch (MB) contained the elastomers, antioxidant, wax, the amino/mercaptan co-AMS, and either the total amount of silica and/or the AMS or two-thirds of the total amount of either the silica and/or the AMS. The target drop mixing temperature was 153° C. The remainder of the silica and/or the AMS was added in a remill (RM1) with a target drop mixing temperature of 153° C. An additional remill (RM2) was used, if necessary, and mixed to 145° C. to further homogenize the mixture. The zinc oxide, sulfur, and accelerators were added in the final batch with a drop mixing temperature of 110° C. All of the compounded final stocks were sheeted and subsequently annealed at 171° C. for 15 minutes.

Four test rubber stocks (stocks 2-5) and one control rubber stock (stock 1) were compounded. The amount of the amino/mercaptan co-AMS added in each of the five stocks is shown in Table 2.

TABLE 1

| Rubber Formulations | |
| --- | --- |
| Ingredient | Amount (phr) |
| SBR* | 48.13 |
| SBR** | 20.00 |
| Natural rubber | 35.00 |
| Carbon black | 11.00 |
| Silica | 52.50 |
| 41.1% co-AMS, added as a 66% aqueous solution, as the diacetate (from Example 1) | Variable |
| Octyl AMS*** | 4.00 |
| Antioxidant**** | 0.96 |
| Wax | 1.00 |
| Stearic acid | 2.00 |
| Zinc oxide | 3.00 |
| Sulfur | 2.22 |
| CBS† | 1.38 |
| MBTS† | 0.63 |
| DPG† | 1.26 |

*Styrene-Butadiene Rubber (25% styrene, 26% vinyl, $T_g$ −50° C., 37.5 phr extended aromatic oil)
**Styrene-Butadiene rubber (60% vinyl, 20% styrene, $T_g$ −34° C.)
***Octyl AMS from Shin-etsu, prepared according to our U.S. patent application Ser. No. 11/752,715
****6-PPD-N-phenyl-N'-dimethyl-butyl-p-phenylenediamine
†CBS = N-cyclohexyl-2-benzothiazole sulfenamide
MBTS = 2,2-dibenzothiazole disulfide (MBTS)
DPG = N,N'-diphenylguanidine

TABLE 2

The loading of the Amino/Mercaptan co-AMS used to prepare rubber stocks

| | Rubber stock | | | | |
| --- | --- | --- | --- | --- | --- |
| | Control Stock 1 | Stock 2 | Stock 3 | Stock 4 | Stock 5 |
| Amino/Mercaptan co-AMS solution (phr) | 0 | 0.4 | 0.8 | 1.2 | 1.8 |

Example 3

Processing Evaluation of Rubber Compound

The processing of the green stocks (i.e., the stock obtained after the final stage, prior to curing) was characterized as to Mooney viscosity and cure characteristics. In particular, the control stock 1, containing an alkyl AMS and zero amino/mercaptan co-AMS and the rubber stocks 2, 3, 4 and 5 containing both the alkyl AMS and 0.4, 0.8, 1.2 and 1.8 phr of the amino/mercaptan co-AMS were evaluated by examining the compound Mooney viscosity and scorch data, as illustrated in Table 3. The Mooney viscosity measurement was conducted at 130° C. using a large rotor. The Mooney viscosity was recorded as the torque when the rotor was rotated for 4 minutes. The samples were preheated at 130° C. for one minute before the rotor was started. A Monsanto Rheometer MD2000 was used to characterize the stock curing process. The frequency was 1.67 Hz and the strain was 7% at 160° C. The $T_{s2}$, $T_{50}$ and $T_{90}$ were obtained from these measurements and represent the time when the torque rose to 2%, 50% and 90%, respectively, of the total torque increase during the curing process. These measurements were used to predict how quickly the viscosity built up ($T_s2$) and the curing rate ($T_{90}$) during the curing process. $T_5$ is the time required to increase 5 Mooney units during the Mooney scorch measurement. It is used as an index to predict how fast the compound viscosity will arise during processing, such as filling the mold, extrusion, and the like. The results of the compound Mooney (ML) and curing characteristics are shown in Table 3. All of the rubber stocks 2-5 containing the amino/mercaptan co-AMS showed ML and curing characteristics that were comparable to the control rubber stock 1 containing no co-AMS.

TABLE 3

The green stock Mooney and curing characteristics

| Stock No. | ML@130° C. | $T_5$@130° C. (Minutes) | $T_{S2}$@160° C. (Minutes) | $T_{50}$@ 160° C. (Minutes) | $T_{90}$ @ 160° C. (Minutes) |
|---|---|---|---|---|---|
| 1 control | 53.1 | 8.17 | 1.34 | 2.78 | 6.48 |
| 2 | 51.1 | 8.35 | 1.62 | 2.70 | 5.38 |
| 3 | 52.7 | 8.33 | 1.60 | 2.56 | 5.10 |
| 4 | 52.5 | 8.06 | 1.60 | 2.48 | 4.90 |
| 5 | 53.6 | 7.52 | 1.46 | 2.19 | 4.51 |

Example 4

Evaluation of Viscoelastic and Mechanical Properties of the Rubber Compounds

1. Bound Rubber Content

The rubber stocks were evaluated as to the bound rubber content to determine the percent of polymer bound to filler particles in the compounded stocks. The bound rubber was measured by immersing small pieces of the uncured compounded stocks in a large excess of a good solvent (toluene) for three days. The soluble rubber was extracted from the samples by the solvent. After three days, any excess toluene was drained off and the sample was air dried and then dried in an oven at approximately 100° C. to a constant weight. The remaining pieces of rubber formed a weak coherent gel containing the filler and some of the original rubber. The amount of rubber that remained with the filler was the bound rubber. The bound rubber content was calculated according to the following equation:

$$\% \text{ Bound Polymer} = \frac{100(Wd - F)}{R}$$

where Wd is the weight of dried gel, F is the weight of filler in gel or solvent insoluble matter (same as weight of filler in original sample), and R is the weight of polymer in original sample. The results, shown in Table 4, illustrated that each of the rubber stocks 2-5 containing the amino/mercaptan co-AMS had about a 10% to about a 28% higher bound rubber content than the control stock 1. Further the increase in the bound rubber content in co-AMS containing stocks occurred without an increase of compound ML listed in the Table 3. Therefore, it appears that the amino/mercaptan co-AMS provided a unique coupling mechanism for reinforcing the silica-filled rubber without the loss of processing properties.

TABLE 4

| Stock No. | Bound Rubber Content, % |
|---|---|
| 1 control | 48 |
| 2 | 53 |
| 3 | 59 |
| 4 | 61 |
| 5 | 61 |

2. Dynamic Viscoelastic Mechanical Properties

The dynamic viscoelastic mechanical properties were obtained from temperature sweep tests conducted with a frequency of 31.4 rad/sec using 0.5% strain for temperatures ranging from −100° C. to −20° C. and 2% strain for temperatures ranging from −20° C. to 100° C. The 50° C. tan δ data were also obtained from strain sweep measurements at a strain level of 2%. A frequency of 3.14 rad/sec was used for the strain sweep which was conducted at 50° C. and 0° C. with strain sweeping from 0.25% to 14.75%. The degree of stabilization of the filler morphology during storage and curing of the compounds was measured by the degree of filler flocculation after compounding (the Payne effect, ΔG').

Other viscoelastic properties were measured by using the dynamic compression test and rebound tests. The sample geometry used for dynamic compression test was a cylindrical button 9.5 mm in diameter and 15.6 mm in length. The sample was compressed under a static load of 2 kg before testing. After it reached an equilibrium state, the test began with a dynamic compression load of 1.25 kg at a frequency of 1 Hz. The sample was then dynamically compressed and then extended and the resultant displacement and hysteresis (tan δ) were recorded.

The Zwick rebound resilience tester measured rebound resilience as a very basic dynamic test. The test piece was subjected to one-half cycle of deformation. The sample geometry was round with a diameter of 38.1 mm and a thickness of 1.91 mm. The specimen was strained by impacting the test piece with an indentor which was free to rebound after the impact. The rebound resilience is defined as the ratio of mechanical energies before and after impact. Samples were preheated 30 minutes prior to testing.

The wet traction of the rubber was evaluated using the British Portable Skid Tester (BPST). The details of the BPST are described in ASTM E-303, Vol. 04.03. It is a portable device in which the specimen is attached to the base of a pendulum arm and contacts the opposing surface during a swing of the pendulum. The weighted pendulum head is free to move vertically on the pendulum arm so that the swing amplitude is determined by the friction of the rubber against the pavement surface. The lower the amplitude of the pendulum swing up after contacting the surface (recorded as a higher value on the scale of the tester), the higher the friction of the rubber against the surface. This instrument is very well adapted to testing the wet traction of the rubbers.

TABLE 5

Dynamic Viscoelastic Properties

| | Stock No. | | | | |
|---|---|---|---|---|---|
| | 1 Control | 2 | 3 | 4 | 5 |
| tan δ @ 50° C. | | | | | |
| temp sweep | 0.1716 | 0.1667 | 0.1603 | 0.1627 | 0.1563 |
| strain sweep | 0.1657 | 0.1591 | 0.1461 | 0.146 | 0.1507 |

TABLE 5-continued

Dynamic Viscoelastic Properties

| | Stock No. | | | | |
|---|---|---|---|---|---|
| | 1 Control | 2 | 3 | 4 | 5 |
| compression dynamics | 0.1935 | 0.1795 | 0.1724 | 0.1680 | 0.1665 |
| Rebound @ 50° C. | 54.20 | 55.00 | 55.20 | 57.00 | 57.00 |
| tan δ @ 0° C. | | | | | |
| temp sweep | 0.2308 | 0.2463 | 0.2408 | 0.2447 | 0.2373 |
| strain sweep | 0.2259 | 0.2271 | 0.2212 | 0.2189 | 0.2178 |
| compression dynamics | 0.2709 | 0.2753 | 0.2684 | 0.2639 | 0.2688 |
| BPST wet traction | 54.5 | 53.8 | 53.7 | 53.4 | 54.0 |
| G' @ −20° C. (MPa) | 16.8 | 13.2 | 12.8 | 12 | 12.2 |
| Δ G' (MPa) | 2.69 | 1.99 | 1.88 | 1.65 | 1.77 |

The results are shown in Table 5. Compared with the control stock 1 containing the alkyl AMS, the stocks 2-5 containing both the alkyl AMS and the amino/mercaptan co-AMS have significantly lower values of Δ G' indicating a greater degree of stabilization of the filler morphology during storage and curing of the compounds as measured by the degree of filler flocculation after compounding. The rubber stocks 2-5 also had lower values of the G' @ −20° C., a lower value of 50° C. tan δ, and equivalent 0° C. tan δ and wet traction values. This is very useful because the value of 50° C. tan δ is used to predict the rolling resistance and the G' at −20° C. and the 0° C. tan δ are used for predicting the snow and wet traction, respectively. The BPST data of all stocks are comparable and suggest that the wet tractions are equivalent. Therefore it is predicted that co-AMS containing stocks would have better snow traction along with better rolling resistance but equal wet traction when compared to rubber stocks not containing co-AMS. The rolling resistance predictions were also confirmed by the rebound test data shown in Table 4.

3. Tensile Mechanical Properties

The tensile mechanical properties were measured using the standard procedure described in ASTM-D 412 at 25. Test specimens are nicked round rings with a dimension of 2.5 mm thickness, and 44 mm and 57.5 mm inside and outside diameters, respectively. A specific gauge length of 25.4 mm is used for the tensile test.

TABLE 6

Tensile Mechanical Properties

| | Stock No. | | | | |
|---|---|---|---|---|---|
| Ring Tensile @ 25° C. | 1 Control | 2 | 3 | 4 | 5 |
| M50 (MPa) | 0.88 | 0.9 | 0.91 | 0.87 | 0.91 |
| M300 (MPa) | 4.66 | 5.08 | 5.19 | 5.19 | 5.65 |
| Tb (MPa) | 12.25 | 13.87 | 13.85 | 13.67 | 14.97 |
| Eb % | 561 | 569 | 564 | 556 | 568 |
| Toughness (MPa) | 27.87 | 31.65 | 31.52 | 30.41 | 34.41 |

The amino/mercaptan co-AMS-containing stocks showed better mechanical properties than the control stock shown in Table 6. In particular, the M50 modulus and the elongation at break were the approximately same as the control, but there was a significant increase in the M300 modulus, the tensile strength at break and the toughness.

As can be seen from the data presented above, rubber stocks containing an amino/mercaptan co-AMS have increased polymer-filler interaction (higher bound rubber content) without an increase in the compound Mooney viscosity. Thus, these stocks have improved silica reinforcement without a loss in processability. Further, the improved dynamic viscoelastic and mechanical properties of these rubber stocks predict that tread compounds made from these rubber stocks will have an improvement in snow traction along with better rolling resistance and equal wet traction and, therefore, an overall improvement in tire performance. Therefore, the rubber stocks containing both the alkyl AMS and the amino/mercaptan co-AMS were significantly improved over the control stocks containing the alkyl AMS.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A vulcanizable rubber composition having improved dynamic viscoelastic and tensile mechanical properties, comprising:
   (a) an elastomer;
   (b) a reinforcing filler selected from silica, carbon black, and mixtures thereof;
   (c) about 0.1 phr to about 20 phr of an alkyl alkoxy-modified silsesquioxane (alkyl AMS); and
   (d) a cure agent,
   wherein the improvement comprises adding to the composition about 0.1 phr to about 20 phr of a weak acid-neutralized solid or weak acid-neutralized aqueous solution of an amino alkoxy-modified silsesquioxane (amino AMS) comprising one or more compounds selected from the group consisting of an amino AMS, an amino/mercaptan co-AMS, an amino/blocked mercaptan co-AMS, and mixtures thereof, and having the formula

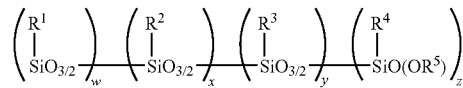

wherein w, x, y and z represent mole fractions, z does not equal zero, at least one of w, x or y must also be present, and w+x+y+z=1.00;
   wherein at least one of $R^1$, $R^2$, $R^3$ and $R^4$ must be present and selected from the group consisting of $R^6Z$, wherein Z is selected from the group consisting of $NH_2$, $HNR^7$ and $NR^7_2$; and the remaining $R^1$, $R^2$, $R^3$ or $R^4$ are the same or different and selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, (iv) $R^6X$, wherein X is selected from the group consisting of Cl, Br, SH, $S_aR^7$, $NR^7_2$, $OR^7$, $CO_2H$, $SCOR^7$, $CO_2R^7$, OH, olefins, epoxides, amino groups, vinyl groups, acrylates and methacrylates, wherein a=1 to about 8, and (v) $R^6YR^8X$, wherein Y is selected from the group consisting of O, S, NH and $NR^7$; wherein $R^6$ and $R^8$ are selected from the group consisting of alkylene groups having one to about 20 carbon atoms, cycloalkylene groups having 3 to about 20 carbon atoms, and a single bond; and $R^5$ and $R^7$ are selected from the group consisting of alkyl groups having one to about 20 carbon atoms, cycloalkyl groups having 3 to about 20 carbon atoms, and alkylaryl groups having 7 to about 20 carbon atoms;
   wherein the amino AMS consists essentially of amino alkoxy-modified silsesquioxanes, each having an open structure with a reactive alkoxysilyl group, and essentially free of closed caged polyhedral organosilsesquioxanes, wherein the mixture of amino alkoxy-modified silsesquioxanes liberates about 0.05% to about 10% by weight alcohol when treated by substantially total acid hydrolysis; and wherein the dynamic viscoelastic and mechanical properties of the rubber composition containing both the alkyl AMS and the weak acid-neutralized solid or solution of the amino AMS are improved over a similar rubber composition comprising the alkyl AMS and not comprising a weak acid-neutralized solid or solution of the amino AMS.

2. The vulcanizable rubber composition of claim 1, wherein at least one of the $R^1$, $R^2$, $R^3$ and $R^4$ groups of the amino AMS comprises a group that binds to the elastomer.

3. The vulcanizable rubber composition of claim 2, wherein the at least one of the $R^1$, $R^2$, $R^3$ and $R^4$ groups comprises a selection from the group consisting of acrylates, methacrylates, aminos, vinyls, mercaptos, sulfurs, sulfides, and combinations thereof.

4. The vulcanizable rubber composition of claim 1, wherein the at least one of the $R^1$, $R^2$, $R^3$ and $R^4$ groups is selected from the group consisting of a mercaptoalkyl group and a blocked mercaptoalkyl group.

5. The vulcanizable rubber composition of claim 1, wherein the amino AMS comprises an amino/mercaptan co-AMS.

6. The vulcanizable rubber composition of claim 1, wherein the weak acid-neutralized solid or weak acid-neutralized aqueous solution of the amino AMS has a pH of about 6.5 to about 4.0.

7. The vulcanizable rubber composition of claim 1, wherein the weak acid-neutralized solid or weak acid-neutralized aqueous solution comprises a weak acid having a $pK_a$ of about 3.5 to about 6.5.

8. The vulcanizable rubber composition of claim 7, wherein the weak acid comprises a weak carboxylic acid.

9. The vulcanizable rubber composition of claim 8, wherein the weak carboxylic acid is selected from the group consisting of acetic acid, ascorbic acid, itaconic acid, lactic acid, malic acid, naphthilic acid, benzoic acid, o-toluic acid, m-toluic acid, p-toluic acid, and mixtures thereof.

10. The vulcanizable rubber composition of claim 1, wherein an amount of alcohol released as VOC during compounding and further processing is substantially zero to about 0.1% by weight of the rubber compound.

11. The vulcanizable rubber composition of claim 10, wherein an amount of alcohol released as VOC during compounding and further processing is substantially zero to about 0.05% by weight of the rubber compound.

12. The vulcanizable rubber composition of claim 1, further comprising a sulfur containing coupling agent.

13. The vulcanizable rubber composition of claim 12, wherein the sulfur containing coupling agent is present in an amount of about 0.05% to about 3% based on the amount of silica present.

14. The vulcanizable rubber composition of claim 13, wherein the sulfur containing coupling agent is selected from the group consisting of mercaptoalkyltrialkoxy silanes, blocked mercaptoalkyltrialkoxy silanes, mercaptoalkylsilanes bound to silica, blocked mercaptoalkylsilanes bound to silica, bis(trialkoxysilylorgano) tetrasulfides or disulfides, and mixtures thereof.

15. The vulcanizable rubber composition of claim 1, wherein the silica is present in an amount of about one phr to about 150 phr.

16. The vulcanizable rubber composition of claim 1, wherein the amino AMS is at least partially supported on the reinforcing filler in a range selected from about 1/99 to about 70/30, about 20/80 to about 60/40, and about 50/50 by weight.

17. The vulcanizable rubber composition of claim 16, wherein the amino AMS is supported on the carbon black.

18. The vulcanizable rubber composition of claim 16, wherein the latent alcohol content of a 50/50 ratio of an amino AMS supported on the reinforcing filler is about 0.5% to about 3%.

19. The vulcanizable rubber composition of claim 1, further comprising a catalyst for an alkoxysilane-silica reaction.

20. The vulcanizable rubber composition of claim 19, wherein the catalyst for the alkoxysilane-silica reaction is selected from the group consisting of a strong organic base having a $pK_a$ in aqueous media of greater than about 10, a strong inorganic base, an alkyl tin catalyst, a zirconium catalyst, a titanium catalyst, and combinations thereof.

21. The vulcanizable rubber composition of claim 20, wherein the strong organic base catalyst is selected from the group consisting of strong alkali metal alkoxides; guanidines; hindered amines; tertiary amines; quaternary ammonium bases; bis-aminoethers; and nitrogen-containing heterocycles having from 5 to 7 ring members, and combinations thereof.

22. The vulcanizable rubber composition of claim 21, wherein the nitrogen-containing heterocycle comprises a substituted or unsubstituted imidazole.

23. The vulcanizable rubber composition of claim 22, wherein the substituted or unsubstituted imidazole is selected from the group consisting of imidazole, 4-ethylamino imidazole, 2-mercapto-1-methyl imidazole, 1-methyl imidazole, 2,4,5-triphenyl imidazole, 2-methyl imidazole, 2-ethyl-4-methyl imidazole, 2-heptadecyl imidazole, and combinations thereof.

24. The vulcanizable rubber composition of claim 21, wherein the guanidine is selected from the group consisting of triphenylguanidine, diphenylguanidine, di-o-tolylguanidine, N,N,N',N'-tetramethylguanidine, and combinations thereof.

25. The vulcanizable rubber composition of claim 24, wherein the guanidine comprises diphenylguanidine.

26. The vulcanizable rubber composition of claim 20, wherein the alkyl tin catalyst is selected from the group consisting of butyl tin tris(2-ethylhexanoate), bis(2-ethyl-hexanoate) tin, butyl tin chloride dihydroxide, butyl tin hydroxide oxide hydrate, dibutyl tin dilaurate, dibutyl tin dimaleate, dibutyl tin oxide, and combinations thereof.

27. The vulcanizable rubber composition of claim 26, wherein the alkyl tin catalyst comprises bis(2-ethyl-hexanoate) tin.

28. The vulcanizable rubber composition of claim 1, wherein the zirconium catalyst is selected from the group consisting of zirconium 2-ethylhexanoate, zirconium tetrakis-(2-ethylhexanoate), tetraoctyl zicronate, zirconium n-butoxide, zirconium t-butoxide, zirconium di-n-butoxide (bis-2,4-pentanedionate), zirconium diisopropoxide bis(2,2,6,6-tetramethyl-3,5-heptanedionate), zirconium ethoxide, zirconium 2-ethylhexoxide, zirconium 3,5-heptanedionate, zirconium isopropoxide, zirconium 2-methyl-2-butoxide, zirconium 2,4-pentanedionate, zirconium n-propoxide, and combinations thereof.

29. The vulcanizable rubber composition of claim 28, wherein the zirconium catalyst comprises zirconium 2-ethylhexanoate.

30. The vulcanizable rubber composition of claim 20, wherein the titanium catalyst is selected from the group consisting of titanium trimethylsiloxide, titanium (isopropoxide)$_2$(2,4-pentandionate)$_2$, titanium (butoxide)$_2$(2,4-pentandionate)$_2$, titanium (isopropoxide)$_2$(ethyl-acetoacetate)$_2$, and combinations thereof.

31. The vulcanizable rubber composition of claim 1, wherein the rubber compound further comprises a silica shielding agent selected from the group consisting of alkoxysilanes, glycols, fatty acid esters of hydrogenated or non-hydrogenated $C_5$ or $C_6$ sugars, polyoxyethylene derivatives of fatty acid esters of hydrogenated or non-hydrogenated $C_5$ or $C_6$ sugars, and mixtures thereof.

32. The vulcanizable rubber composition of claim 1, wherein the elastomer is selected from the group consisting of homopolymers of a conjugated diene monomer, and copolymers and terpolymers of the conjugated diene monomers with monovinyl aromatic monomers and trienes.

33. The vulcanizable rubber composition of claim 1, wherein the elastomer is selected from the group consisting of styrene/butadiene copolymer, polyisoprene, polybutadiene, butadiene/isoprene copolymer, butadiene/isoprene/styrene terpolymers, isoprene/styrene copolymer, natural rubber, butyl rubber, ethylene-propylene-diene rubber and combinations thereof.

34. A pneumatic tire including at least one component comprising a vulcanized rubber compound made from a vulcanizable rubber composition having improved dynamic viscoelastic and tensile mechanical properties, comprising:
(a) an elastomer;
(b) a reinforcing filler selected from silica, carbon black, and mixtures thereof;
(c) about 0.1 phr to about 20 phr of an alkyl alkoxy-modified silsesquioxane (alkyl AMS); and
(d) a cure agent,
wherein the improvement comprises adding to the composition about 0.1 phr to about 20 phr of a weak acid-neutralized solid or weak acid-neutralized aqueous solution of an amino alkoxy-modified silsesquioxane (amino AMS) comprising one or more compounds selected from the group consisting of an amino AMS, an amino/mercaptan co-AMS, an amino/blocked mercaptan co-AMS, and mixtures thereof, and having the formula

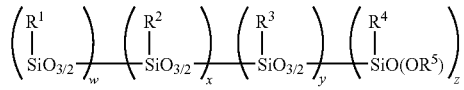

wherein w, x, y and z represent mole fractions, z does not equal zero, at least one of w, x or y must also be present, and w+x+y+z=1.00; wherein at least one of $R^1$, $R^2$, $R^3$ and $R^4$ must be present and selected from the group consisting of $R^6Z$, wherein Z is selected from the group consisting of $NH_2$, $HNR^7$ and $NR^7_2$; and the remaining $R^1$, $R^2$, $R^3$ or $R^4$ are the same or different and selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, (iv) $R^6X$, wherein X is selected from the group consisting of Cl, Br, SH, $S_aR^7$, $NR^7_2$, $OR^7$, $CO_2H$, $SCOR^7$, $CO_2R^7$, OH, olefins, epoxides, amino groups, vinyl groups, acrylates and methacrylates, wherein a=1 to about 8, and (v) $R^6YR^8X$, wherein Y is selected from the group consisting of O, S, NH and $NR^7$; wherein $R^6$ and $R^8$ are selected from the group consisting of alkylene groups having one to about 20 carbon atoms, cycloalkylene groups having 3 to about 20 carbon atoms, and a single bond; and $R^5$ and $R^7$ are selected from the group consisting of alkyl groups having one to about 20 carbon atoms, cycloalkyl groups having 3 to about 20 carbon atoms, and alkylaryl groups having 7 to about 20 carbon atoms;
wherein the amino AMS consists essentially of amino alkoxy-modified silsesquioxanes, each having an open structure with a reactive alkoxysilyl group, and essentially free of closed caged polyhedral organosilsesquioxanes,
wherein the mixture of amino alkoxy-modified silsesquioxanes liberates about 0.05% to about 10% by weight alcohol when treated by substantially total acid hydrolysis; and
wherein the dynamic viscoelastic and mechanical properties of the rubber composition containing both the alkyl AMS and the weak acid-neutralized solid or weak acid-neutralized solution of the amino AMS are improved over a similar rubber composition comprising the alkyl AMS and not comprising a weak acid-neutralized solid or weak acid-neutralized solution of the amino AMS.

35. The pneumatic tire of claim 34, wherein the tire component is selected from the group consisting of treads, sub-treads, sidewalls, body ply skims, bead fillers, apex, chafer, sidewall insert, wirecoat, inner liner, and combinations thereof.

36. The pneumatic tire of claim 35, wherein at least one component comprises a tire tread.

37. A vulcanizable rubber composition having improved dynamic viscoelastic and tensile mechanical properties, comprising:
(a) an elastomer;
(b) a reinforcing filler selected from silica, carbon black, and mixtures thereof;
(c) about 0.1 phr to about 20 phr of an alkyl alkoxy-modified silsesquioxane (alkyl AMS); and
(d) a cure agent,
wherein the improvement comprises adding to the composition about 0.1 phr to about 20 phr of a weak acid-neutralized solid or weak acid-neutralized aqueous solution of an amino alkoxy-modified silsesquioxane (amino AMS) comprising one or more compounds selected from the group consisting of an amino AMS, an amino/mercaptan co-AMS, an amino/blocked mercaptan co-AMS, and mixtures thereof, having the formula

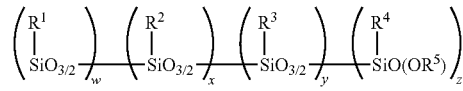

wherein w, x, y and z represent mole fractions, z does not equal zero, at least one of w, x or y must also be present, and w+x+y+z=1.00;
wherein at least one of $R^1$, $R^2$, $R^3$ and $R^4$ must be present and selected from the group consisting of $R^6Z$, wherein Z is selected from the group consisting of $NH_2$, $HNR^7$ and $NR^7_2$; and the remaining $R^1$, $R^2$, $R^3$ or $R^4$ are the same or different and selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, (iv) $R^6X$, wherein X is selected from the group consisting of Cl, Br, SH, $S_aR^7$, $NR^7_2$, $OR^7$, $CO_2H$, $SCOR^7$, $CO_2R^7$, OH, olefins, epoxides, amino groups, vinyl groups, acrylates and methacrylates, wherein a=1 to about 8, and (v) $R^6YR^8X$, wherein Y is selected from the group consisting of O, S, NH and $NR^7$; wherein $R^6$ and $R^8$ are selected from the group consisting of alkylene groups having one to about 20 carbon atoms, cycloalkylene groups having 3 to about 20 carbon atoms, and a single bond; and $R^5$ and $R^7$ are selected from the group consisting of alkyl groups having one to about 20 carbon atoms, cycloalkyl groups having 3 to about 20 carbon atoms, and alkylaryl groups having 7 to about 20 carbon atoms, wherein the weak acid-neutralized solid or weak acid-neutralized solution of the amino AMS is made by a method comprising the steps of:

(a) combining as a reaction mixture:
  (i) water,
  (ii) a solvent for the water,
  (iii) a hydrolysis and condensation catalyst,
  (iv) an aminotrialkoxysilane
  (v) an optional selection from the group consisting of a mercaptoalklytrialkoxysilane, a blocked mercaptoalkyl-trialkoxysilane, and mixtures thereof;

(b) allowing the reaction mixture to react for about 0.5 hours to about 200 hours to form an amino alkoxysilane-modified silsesquioxane (amino AMS);

(c) recovering the amino AMS from the reaction mixture, wherein the amino AMS consists essentially of amino alkoxy-modified silsesquioxanes, each having an open structure with a reactive alkoxysilyl group, and essentially free of closed caged polyhedral organosilsesquioxanes; and (d) adding a weak acid to a selection from the group consisting of the reaction mixture of step (a), the recovered amino AMS of step (c), and a combination of steps (a) and (c), to substantially neutralize the amino groups, wherein the dynamic viscoelastic and mechanical properties of the rubber composition containing both the alkyl AMS and the weak acid-neutralized solid or solution of the amino AMS are improved over a similar rubber composition comprising the alkyl AMS and not comprising a weak acid-neutralized solid or solution of the amino AMS.

38. The vulcanizable rubber composition of claim 37, wherein the weak acid has a $pK_a$ of about 3.5 to about 6.5.

39. The vulcanizable rubber composition of claim 37, wherein the weak acid-neutralized solid or weak acid-neutralized aqueous solution of the amino AMS has a pH of about 6.5 to about 4.0.

40. The vulcanizable rubber composition of claim 37, wherein the hydrolysis and condensation catalyst is selected from the group consisting of a strong acid, a strong organic acid, a solid strong cationic resin, and mixtures thereof.

41. The vulcanizable rubber composition of claim 40, wherein the hydrolysis and condensation catalyst comprises a solid strong cationic resin and the weak acid of step (d) is added to the reaction mixture of step (a) to substantially neutralize the amino groups.

42. The vulcanizable rubber composition of claim 37, wherein the hydrolysis and condensation catalyst comprises a selection from the group consisting of a strong base, a strong organic base, and mixtures thereof.

43. The vulcanizable rubber composition of claim 42, wherein the weak acid of step (d) is added to the recovered amino AMS of step (c) to substantially neutralize the amino groups.

44. The vulcanizable rubber composition of claim 37, wherein the composition comprises (v) a selection from the group consisting of a mercaptoalklytrialkoxysilane, a blocked mercaptoalkyltrialkoxysilane, and mixtures thereof and the method further comprises the substep of adding an S-S bond reducing agent to a selection from the group consisting of the reaction mixture in step (a), the amino AMS recovered in step (c), and a combination of steps (a) and (c).

45. The vulcanizable rubber composition of claim 44, wherein the reducing agent is present in an amount sufficient to form a clear aqueous stable solution of the amino AMS.

46. The vulcanizable rubber composition of claim 37, wherein an amount of alcohol released as VOC during compounding and further processing is substantially zero to about 0.05% by weight of the rubber compound.

* * * * *